(12) United States Patent
Chatani (10) Patent No.: US 7,149,804 B2
(45) Date of Patent: Dec. 12, 2006

(54) METHOD AND SYSTEM FOR PROVIDING EVALUATION OF TEXT-BASED PRODUCTS

(75) Inventor: Masayuki Chatani, Foster City, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 690 days.

(21) Appl. No.: 09/846,100

(22) Filed: Apr. 30, 2001

(65) Prior Publication Data

US 2004/0073625 A1    Apr. 15, 2004

(51) Int. Cl.
*G06F 15/16* (2006.01)
*G06F 15/173* (2006.01)
*G06F 7/00* (2006.01)

(52) U.S. Cl. .......................... 709/229; 709/217; 707/2; 707/10

(58) Field of Classification Search ................ 709/217, 709/229; 705/6, 7, 10, 12, 14, 26–29, 35; 707/1–10, 102, 103, 104, 501, 509, 513
See application file for complete search history.

(56) References Cited

U.S. PATENT DOCUMENTS

| | | | |
|---|---|---|---|
| 4,996,642 A | 2/1991 | Hey | 364/419 |
| 5,517,622 A * | 5/1996 | Ivanoff et al. | 709/232 |
| 5,559,949 A | 9/1996 | Reimer et al. | 395/161 |
| 5,704,017 A | 12/1997 | Heckerman et al. | 395/61 |
| 5,749,081 A | 5/1998 | Whiteis | 707/102 |
| 5,790,426 A | 8/1998 | Robinson | 364/554 |
| 5,835,087 A | 11/1998 | Herz et al. | |
| 5,870,579 A | 2/1999 | Tan | 395/393 |
| 5,872,850 A | 2/1999 | Klein et al. | 380/49 |
| 5,884,282 A | 3/1999 | Robinson | 705/27 |
| 5,897,622 A | 4/1999 | Blinn et al. | 705/26 |

(Continued)

FOREIGN PATENT DOCUMENTS

WO    WO 98 33135 A    7/1998

(Continued)

OTHER PUBLICATIONS

Mooney et al.: "Content-based book recommending using learning for text categorization" Proceedings of the SIGIR-99 Workshop on Recommender Systems: Algorithms and Evaluation.,-Aug. 1999 XP002259264 Berkeley, CA * abstract* *p. 1, right-hand col., paragraph 2—paragraph 3* *p. 2, left-hand col., line 25—line 27* *p. 2, left hand col., last paragraph*.

(Continued)

*Primary Examiner*—Ario Etienne
*Assistant Examiner*—El Hadji M Sall
(74) *Attorney, Agent, or Firm*—Martine Penilla & Gencarella, LLP (57) ABSTRACT

A system for providing customized text content ratings and recommendations based on information concerning the text content that a customer has previously read. The system includes a book database, a customer database, a database server, and a web server. The customer performs a book registration function followed by a book rating function. In the registration function, information regarding texts that the customer has previously read is compiled and stored in the customer database. In the rating function, the customer establishes text product that he is considering buying. The server searches keyword data of the customer database based on keywords associated with the chosen product. The database server determines one or more books or other text product having the most matching keywords and ranks the products according to a scale, and presents a rating information for the chosen text product keyed to the closest text the customer has read.

17 Claims, 7 Drawing Sheets

U.S. PATENT DOCUMENTS

| | | | | |
|---|---|---|---|---|
| 5,950,172 | A | | 9/1999 | Klingman ..................... 705/26 |
| 6,016,475 | A | | 1/2000 | Miller et al. .................... 705/1 |
| 6,029,161 | A | | 2/2000 | Lang et al. ..................... 707/1 |
| 6,055,513 | A | | 4/2000 | Katz et al. ..................... 705/26 |
| 6,064,980 | A | | 5/2000 | Jacobi et al. ................. 705/26 |
| 6,108,493 | A | | 8/2000 | Miller et al. ........... 395/200.49 |
| 6,112,186 | A | * | 8/2000 | Bergh et al. ................... 705/10 |
| 6,266,659 | B1 | * | 7/2001 | Nadkarni ........................ 707/3 |
| 6,321,221 | B1 | * | 11/2001 | Bieganski ...................... 707/5 |
| 6,363,390 | B1 | * | 3/2002 | Shapiro et al. ............. 707/100 |
| 6,460,036 | B1 | * | 10/2002 | Herz ........................... 707/10 |
| 6,460,072 | B1 | * | 10/2002 | Arnold et al. ............... 709/203 |
| 6,611,862 | B1 | * | 8/2003 | Reisman ..................... 709/217 |
| 6,631,404 | B1 | * | 10/2003 | Philyaw ....................... 709/217 |
| 6,953,343 | B1 | * | 10/2005 | Townshend ................. 434/178 |
| 2002/0038819 | A1 | * | 4/2002 | Ushioda et al. ............. 235/386 |

FOREIGN PATENT DOCUMENTS

WO        WO 00 28427 A     5/2000

OTHER PUBLICATIONS

Meeteren et al.: Using content-based filtering for recommendation: ECML/MLNET Workshop on Machine Learning and the New Information Age, [Online]—2000 pp. 47-56, XP002258617 Barcelona Retrieved from the Internet: <URL:http://www.ics.forth.gr/~potamias/mlnia/paper_6.pdf> [retrieved on Oct. 21, 2003] *p.1-p. 7, paragraph 1 * & Someren: "Recent papers Maarten van Someren" XXX, [Online] Retrieved from the Internet: URL:http://www.swi.psy.uva.nl/usr/maarten/papers.html> [retrieved on Oct. 21, 2003] includes publication date of papers.

Balabanovic M et al.: "FAB: Content-Based, Collaborative Recommendation." Communications of the Association for Computing Machinery. NY, US, vol. 40, No. 3, Mar. 1, 1997, pp. 66-72, XP000689872 ISSN: 0001-0782 *the whole document*.

Kumar R et al.: Recommendation systems: a probabilistic analysis: Foundations of Computer Science, 1998. Proceedings. 39th Annual Symposium on Palo Alto, CA, USA, IEEE Comput. Soc, US, Nov. 8, 1998, pp. 664-673, XP010318861 ISBN: 0-8186-9172-7 *the whole document*.

* cited by examiner

METHOD AND SYSTEM FOR PROVIDING EVALUATION OF TEXT-BASED PRODUCTS

FIELD OF THE INVENTION

The present invention relates generally to information acquisition and product reviews, and more specifically, to a computer-based method for providing customized text content ratings and/or recommendations.

BACKGROUND OF THE INVENTION

Many methods and systems for providing information, ratings and/or recommendations on text or written materials, such as books, involve computer-based environments and access to databases storing information on such written materials. In many such networked computer environments, the requirements for providing useful information, ratings or recommendations can vary greatly in response to input from or information regarding the subject user (or "customer" hereinafter). For example, in situations where a customer desires book information or recommendations via the World Wide Web (i.e., a book shopping search, such as on Amazon.com®), knowledge of parameters such as what types of books the customer enjoys as well as which books the customer has already read are required to provide the most useful results. Not only do these parameters vary greatly from customer to customer, but they can also include information as to how the tastes of one customer correspond to those of another. One method of generating such personalized recommendation is known as collaborative filtering.

Collaborative filtering methods in this field operate at the most basic level by asking each customer to rate books or other written matter that the customer is familiar with. These ratings are then analyzed and used to correlate and divulge various specific characteristics or commonalities from the totality of ratings data. A profile may be derived for each customer, and comparison of one customer's profile with similar profiles can be done to identify items of potential interest.

Regardless of the specific parameters or filtering method involved, however, the information, ratings and/or recommendations must be useful to the customer and helpful for the task at hand to ensure continued popularity and success of that network environment. For example, current methods of providing book ratings or recommendations are frequently unsatisfactory due to the lack of information provided, lack of more appropriate information, and/or the inefficient or otherwise problematic functionality of acquiring information. Particularly with regard to the provision of book-related systems over networked computer environments, a customer is frequently given ratings or recommendations that are only based on information on what other people thought about the written material in general. However, for ratings or recommendations that require more useful and/or individual-specific response, current methods of book or text content related assistance and interaction have significant drawbacks.

One problem with current methods of providing such text content-related assistance over a network is that the procedures undertaken to determine the ratings or recommendations do not take into account information relating to the current customer's profile, likes and/or dislikes. For text content-related assistance that involves some analysis of the current customer's preferences to provide useful information for more helpful ratings and recommendations, this presents a burden in the provision of effective assistance.

A drawback with some current collaborative methods of providing text content-related assistance over a network is that the procedures undertaken to acquire and populate a database with current customer preference data frequently present a complex, large or frustrating burden to customers, particularly new users, of the system. For systems that otherwise derive advantage from ease-of-use and/or other such characteristics of attractiveness to a customer, this again presents a burden in acquiring appropriate results and presenting helpful information.

Another drawback is that current methods of such ratings or recommendations typically use static or overly simplistic algorithms for determining potential books for a customer. This approach often leads to non-dynamic results and misses the objective of obtaining information that is as useful as possible.

Therefore, current systems and methods of rating or recommendation are generally unable to provide the usefulness, flexibility, and customer-specific objectives required to efficiently and effectively provide the satisfactory results necessary for meaningful identification, rating or recommendation of text content, such as books.

SUMMARY OF THE INVENTION

A system and computer-based method for providing, in a network environment, customized text content ratings and/or recommendations based on certain information, such as information concerning the text content that a customer has read. The system includes a first (or book) database, a customer database, a database server for searching, retrieving and comparing data from the databases, a web server to connect the database server to the network, and a customer connected to the database server over a network. In one embodiment, the customer performs a book registration function followed by a book rating function. In the registration function, information regarding the books and other periodicals that have been read by the customer is acquired, compiled by the database server, and stored in the customer database. One book registration method done prior to any rating function includes the generation of a search result list (based on criteria entered by the customer), from which the customer can then select one or more books to register. In the book rating function, a customer establishes a book that he is considering, and the web server requests the database server to search keyword data of the customer database based on keywords associated with the chosen book. Then, the database server: (1) determines one or more books having the most matching keywords and grades the books according to a calculated similarity rate, and (2) presents similarity information and a rating (for the chosen book) keyed to the closest book the customer has read.

In another embodiment, there is no initial book registration function as described above. The database server first provides (via keyword matching) a list of books related to a chosen book, allowing the customer to then select and register any books he has read from the list. Yet another embodiment employs a second algorithm to provide a different result; wherein data on related books is retrieved, sorted according to sales, keywords and other factors, and presented on a result list. An unsuitable result list can yield a new search based on different factors.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

In a network environment, a system and computer-based method for providing book ratings and/or recommendations that are customized based on user profiles and/or other information is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Hardware Overview

Aspects of the present invention may be implemented on one or more computers executing software instructions. According to one embodiment of the present invention, server and client (or customer) computer systems transmit and receive data over a computer network or standard telephone line. Internet-based communication via bi-directional networks is the preferred embodiment, although wireless and other data transmission systems not requiring a persistent cable connection are also contemplated. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

Additionally, although the embodiments of the present invention are described in relation to the rating and review of books, it should be understood that such embodiments are also directed to the revue of other types of written text-based, or graphical material, such as magazines, computer generated text, illustrations, and other types of written or graphical material.

Book Rating & Recommendation System

Figure 1:
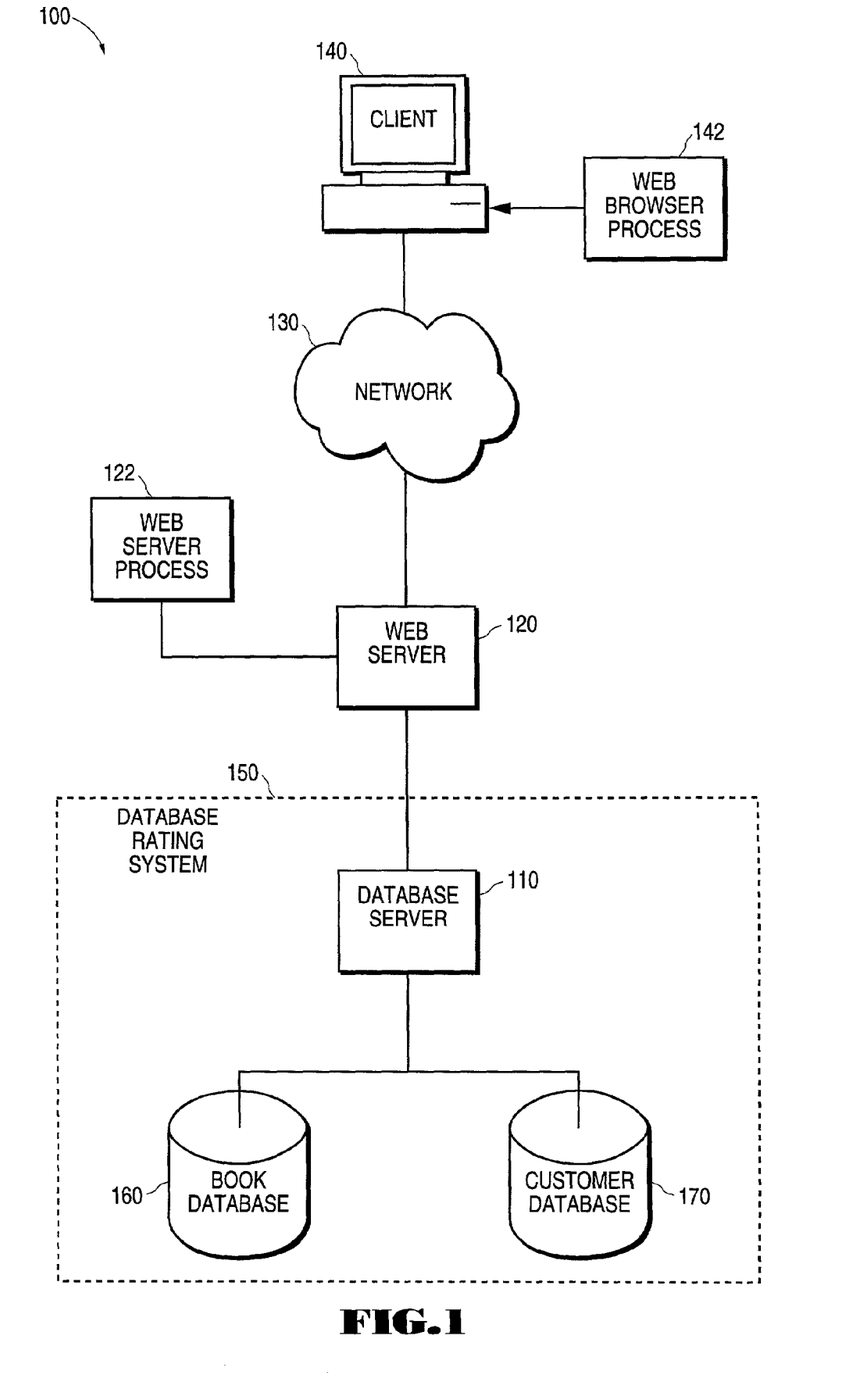
FIG. 1 illustrates a block diagram of a computer network environment that implements embodiments of the present invention.

FIG. 1 is a block diagram of a computer network system that can be used to provide book ratings and/or recommendations that can be tailored to an individual customer and to other information, according to embodiments of the present invention. The book rating and recommendation system 100 of FIG. 1 enables book ratings and recommendations to be customized based on books that the customer has read, and more specifically, based on keywords or other information related to and/or representative of books that have been read by the customer and registered in the customer database 170.

With regard to the system configuration, as seen in FIG. 1, the book rating and recommendation system 100 can be discussed in terms of a server side having a database server 110, a book database 160, a customer database 170, and a web server 120 that connects the database server 110 to a bidirectional network 130. The database server 110 is shown connected directly to the databases 160, 170 in this embodiment, however server connection to these or comparable databases can be made over any type of network as well. Data and information covering all books within the scope of the system are stored in the book database 160. The customer database 170 contains data and information about the books that each individual customer or customer has read. In this embodiment, the database server 110, the book database 160 and the customer database 170 may be addressed as a single unit and referred to as the rating/database system 150, as seen in FIG. 1. On the server side, many hardware configurations are possible; the web server 120 and the database server 110 can be the same computer, or the database server 110 and one of the databases can be one computer, etc. Essentially, these hardware components can be arranged in any functioning variation.

The database server 110 is a server system that is set up to handle book-related search requests from a customer. Access to the database server 110, which may comprise one of several servers, is facilitated through web server 120 and a typical device known as a router (not shown) on the network 130. The web server 120 and then the database server 110 interact with and/or receive interactive data from a customer, and they execute different server functionality, such as the database server 110 procedure of accessing requested book data/information from the book database 160, as detailed below. Along with handling such requests for access of book data and information, the database server 110 also processes the customer's book data from the customer database 170. All of the necessary data and information handled by both the web server 120 and the database server 110, then, is generally transmitted by the web server 120 via the network by means of a known networking protocol standard, such as ftp (file transfer protocol).

As seen in FIG. 1, the client side configuration includes a client 140 and an associated web browser process 142. The client 140 can be a personal computer, a set top box, a computer/gaming device such as a Sony® PlayStation®2, a computing device of comparable capabilities, or any terminal device providing access to the system. The web browser process 142 is complimentary to a web server process 122 (executed by the web server 120) on the other side of the network 130. In the presently preferred embodiment, the web server 120 is a World-Wide Web (WWW) server that stores data in the form of 'web pages' and transmits these pages as Hypertext Markup Language (HTML) files over the network 130 (preferably the Internet) to one or more of the client computers 140. For this embodiment, the client computer 140 runs the "web browser" process 142 to access the web pages served by web server 120. Additional web based content can be provided to client computer 140 by separate content providers, such as a supplemental server (not shown).

In other embodiments, the network 130 may be a Wide Area Network (WAN), a Local Area Network (LAN), or any combination of these and/or the Internet. The network is normally a bi-directional digital communications network that connects a client's terminal hardware with the web server 120. With current technologies, a CATV (cable television) bi-directional network, ISDN (Integrated Services Digital Network), DSL (Digital Subscriber Line), or xDSL high-speed networks are examples of existing network infrastructures enabling the necessary network connections for implementing embodiments of the present invention, though they are not intended to be exclusive as to the types of networks capable of practicing the present invention.

In one embodiment of the present invention, the book rating and recommendation system of the currently preferred embodiment is realized by means of a graphical user interface (GUI) displayed on applicable computers or devices participating over the network. A primary objective of the invention is to supply a customer with the power of interactive capabilities, such as interactive means to register the books he or she has read. In general a web server, such as web server 120 in FIG. 1, handles all of the initial functionality surrounding the GUI and associated interactivity of the customer.

Figure 2:
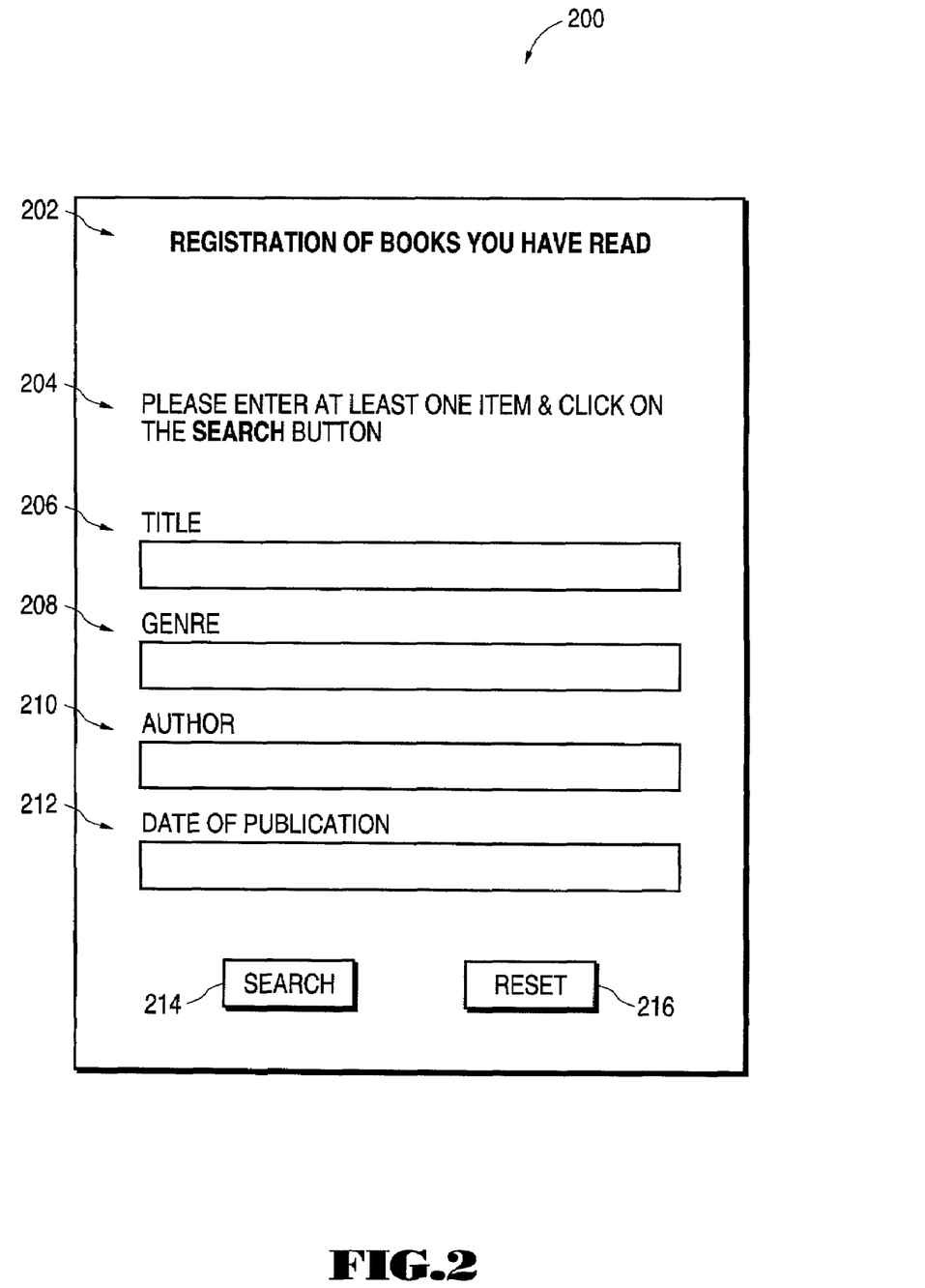
FIG. 2 illustrates an exemplary database server web page output for the book registration function, showing a preliminary input/request page to be filled in by the customer, according to one embodiment of the present invention.
Figure 3:
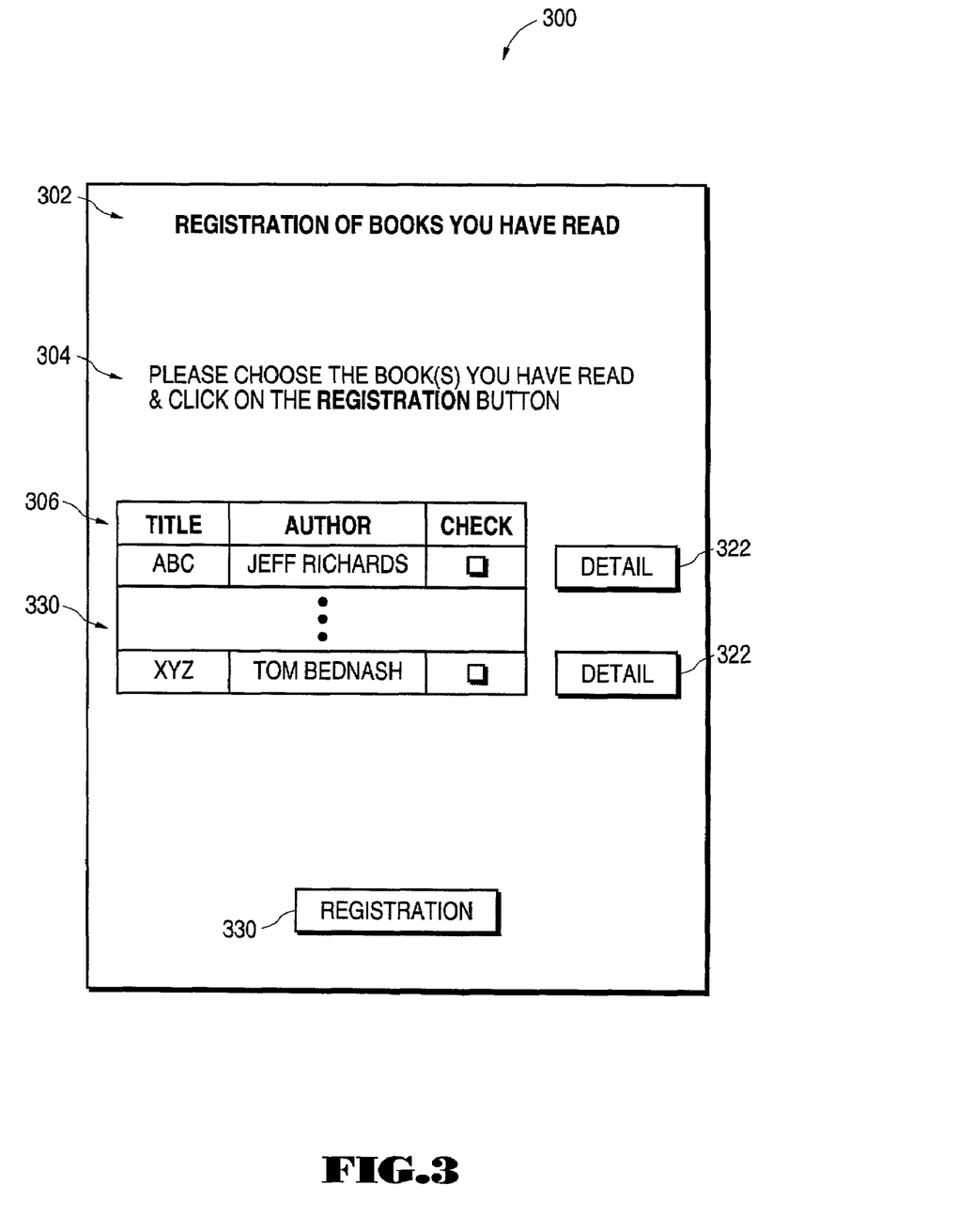
FIG. 3 illustrates an exemplary database server web page output for the book registration function, showing a list of potential books for customer selection, according to one embodiment of the present invention.
Figure 4:
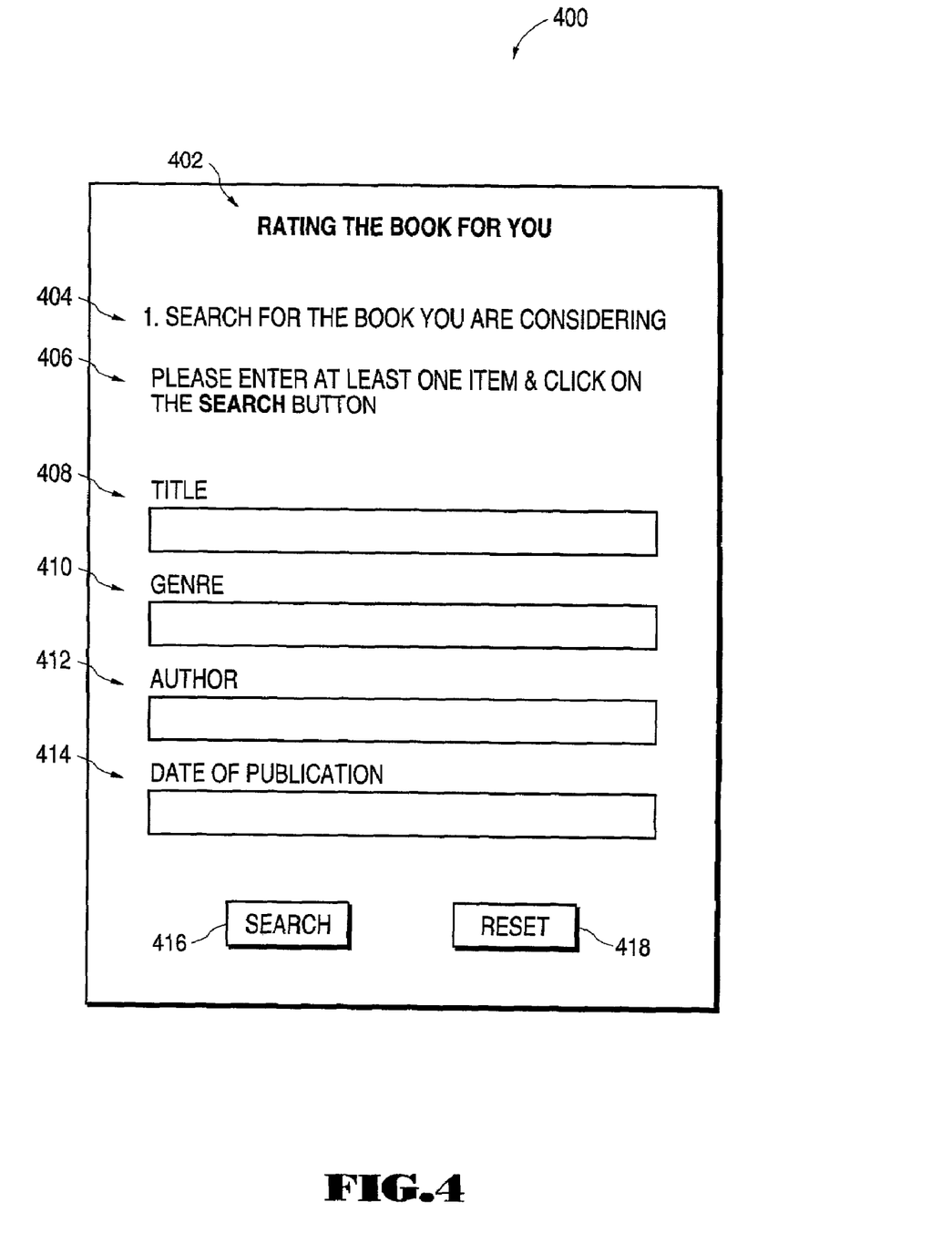
FIG. 4 illustrates an exemplary database server web page output for the book rating function, showing a preliminary input/request page to be filled in by the customer, according to one embodiment of the present invention.
Figure 5:
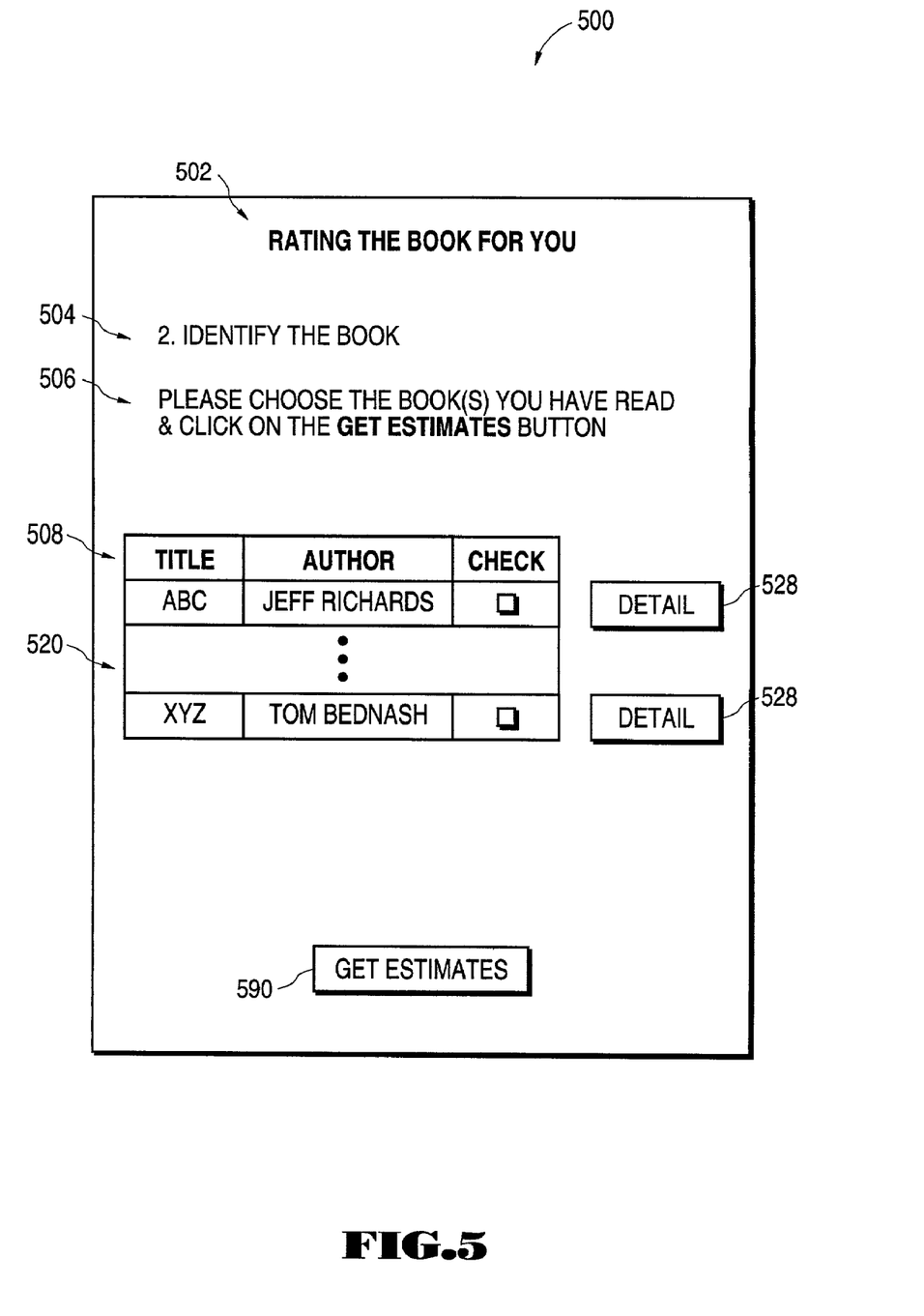
FIG. 5 illustrates an exemplary database server web page output for the book rating function, showing a list of results from the customer's search request (ideally including the intended book), according to one embodiment of the present invention.
Figure 6:
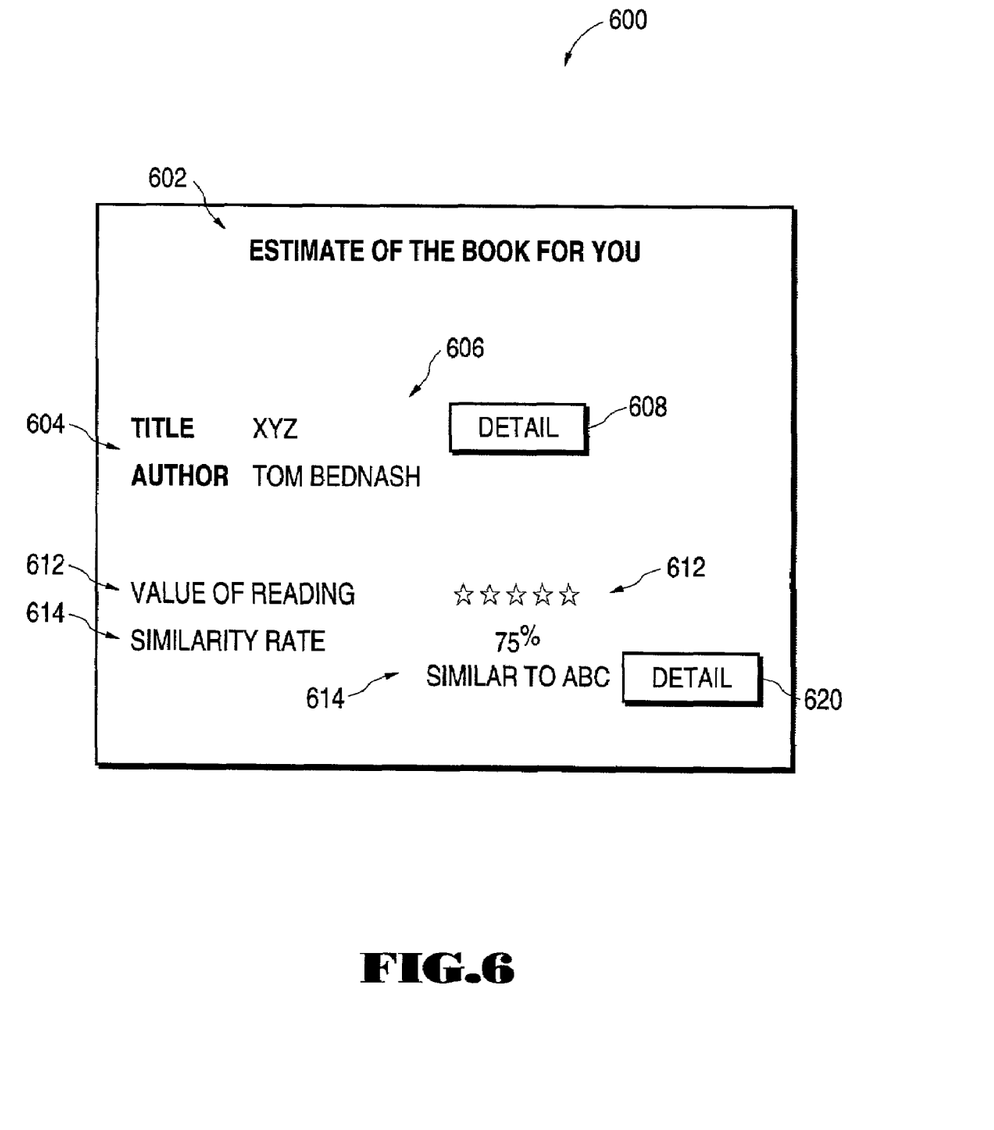
FIG. 6 illustrates an exemplary database server web page output for the book estimating function, showing the chosen book and its correlation to the closest registered book, according to one embodiment of the present invention.

There are multiple graphical user interfaces showing input and display information for the book registration and evaluation or rating functionalities, according to one or more embodiments of the present invention. As used herein, the term evaluation most properly includes both the rating and similarity data or estimates provided for a search item (i.e., book), although the term rating may also be used in this broad fashion to cover both rating and similarity data or estimates). In one embodiment, a customer initially registers books he has read. A customer then interacts with the rating functionality to produce a recommendation or estimate of interest. Preliminary and subsequent graphical user interfaces that provide interactive registration options and functionality for display at the client 140 are shown in FIGS. 2 and 3. Three stages of graphical user interfaces that provide interactive rating and estimate functionality or options for display at the client 140 are shown in FIGS. 4, 5 and 6.

Book Registration Process

A graphical user interface displaying an exemplary web page output for book registration, provided to the client by the web server and showing a preliminary input/request page to be filled in by the customer, according to one embodiment of the present invention is shown in FIG. 2. The preliminary registration GUI 200 of FIG. 2 is comprised of a header field 202, an instruction field 204, a book title section 206, a book genre section 208, a book author section 210, a date of publication section 212, a search button 214, and a reset button 216. The header field 202 recites "Registration of books you have read," outlining the purpose of these two GUIs (FIGS. 2 and 3) and the registration function in general. The instruction field 204 recites "Please enter at least one item and click on the 'search' button," indicating the instruction for using the next four search fields to locate or identify books that the customer has read or has potentially read.

The four fields of FIG. 2 are the book title field 206, the book genre field 208, the book author field 210, and the date of publication field 212. Each of these four fields is comprised of a header line (stating 'title,' 'genre,' 'author' and 'date of publication,' respectively), and a text entry box, as is well known in the field of interactive web-based search environments. The reset button 216 is provided to clear unwanted entries from the text entry boxes of each of the above four fields. As one of the last steps of the customer registration process, the search button 214 can be selected to execute a search of the book database for books that satisfy the one or more criteria entered in the fields above.

In the preferred embodiment of the registration process, the search criteria is transmitted from the client 140, over the World Wide Web, to the web server 120; the web server 120 then transmits the search criteria to the database server 110. The database server 110 searches the book database 160 and retrieves information associated with the book(s) that the customer is attempting to register.

The book database 160 stores all of the various data for each of the books within the scope of the system. This book data includes at least a book identification category, a title category and a keyword category for rating, and may optionally include an author category, a summary category, a contents category, a publisher category, sales information, publication date, an evaluation by other customers category and/or any other book-related categories such as those currently being utilized by Amazon.com®. Once the database server locates one or more matching books from the book database 160, information on these one or more matching books is transmitted to the web server for transmission over the network to the client.

A graphical user interface displaying an exemplary web page output for book registration provided to the client by the web server, showing the subsequent (to FIG. 2) input/request page to be addressed by the customer, according to one embodiment of the present invention is shown in FIG.

3. The subsequent registration GUI 300 of FIG. 3 is comprised of a header field 302, an instruction field 304, a results list header box 306, a results list 320, one or more 'more detail' buttons 322, and a registration button 330. The header field 302 recites "Registration of books you have read," outlining the purpose of these two GUIs and the registration function in general. The instruction field 304 recites "Please choose the book(s) you have read and click on the 'registration' button," indicating the instruction for commencing the population of the customer database with the books that the customer has read.

Below the instruction field 304, as seen in FIG. 3, is the results list 320 and the results list header box 306. The results list header box 306 contains the column headings of the particular categories, for the items in the result list, that are desired to communicate the potential books that the customer may have read. In the embodiment shown in FIG. 3, the results list header box includes title and author headers of the potential books, as well as a check box column-header. The corresponding results list 320 contains the titles of the potential books (here, ABC and XYZ) as well as the authors of the potential books (here, Jeff Richards and Tom Bednash). The registration result list can contain a single book or a plurality of books. The result list 320 also contains check boxes selectable with a cursor/mouse that will flag that entry for registration into the customer database. All of the flagged potential book entries are then registered into the customer database when the registration button 330 is selected.

The above registration methodology lends itself well to preliminary search techniques that allow a customer to search a book database based on one or more fields, and then choose any books he has read from the potential books in the result list. With regard to the sequence of network environment steps, first the web server sends information regarding the preliminary registration GUI to the client 140. The client 140 then displays this information, as seen in FIG. 2. After input by the customer and transmission over the network, then, the web server 120 requests the database server 110 to search the book database 160 based on the inputted information. Next, the database server 110 searches the book database and sends the search results to the web server 120. According to these results, the web server 110 generates a result list of books and sends it to the client 140, who displays the list as seen in FIG. 3. Once the customer selects the applicable books and clicks the 'registration' button, the selected book data is sent to the web server 120. The web server 120 then requests the database server 110 to store the assigned book identification in the customer database 170, associated with the customer ID or customer profile.

As used throughout this disclosure, the step of registering can consist of simply storing the information in question, or it can also include additional methodology such as that detailed throughout the specification and figures. A customer may also register books that he or she has read in a variety of other fashions, many of which are well known. The customer might simply be able to enter the book ISBN (International Standard Book Number), or if the books are present, the customer can use a barcode reader to scan the books in. Additionally, books may be registered by the recordation and transfer of such book information from purchase records. Such a purchase record cannot only be imported from online purchases, but also from offline purchases using any sort of identification record (i.e., credit card, etc.). In addition to registering books purchased at either conventional or online stores, a customer can also register any magazines that the customer has read or receives regularly.

Book Evaluation (Rating, Similarity and Estimation) Processes

A graphical user interface displaying an exemplary web page output for the book rating function, showing a preliminary input/request page to be filled in by the customer, according to one embodiment of the present invention, is shown in FIG. 4. The preliminary rating GUI 400 of FIG. 4 is comprised of a header field 402, a first instruction field 404, a second instruction field 406, a book title section 408, a book genre section 410, a book author section 412, a date of publication section 414, a search button 416 and a rest button 418. The header field 402 recites "Rating the book for you," outlining the purpose of this GUI, and also the rating function, in general. The first instruction field 404 of FIG. 4 delineates the first (preliminary) step of the rating function, reciting "Search for the book you are considering." The second instruction field 406 of FIG. 4 provides specific instruction for the first step in the rating function, as outlined in the first instruction field 404; the specific instruction is "Please enter at least one item and click on the 'search' button." The second instruction field 406, then, indicates instruction for using the next four search fields to locate or identify books that the customer wishes to get an estimate for. The items to be entered in the search fields are detailed below.

The four search fields of FIG. 4 are the book title field 408, the book genre field 410, the book author field 412, and the date of publication field 414. Each of these four fields is comprised of a header line (stating 'title,' 'genre,' 'author' and 'date of publication,' respectively), and a text entry box, as is well known in the field of interactive web-based search environments. The reset button 418 is provided to clear unwanted entries from the text entry boxes of each of the above four fields. Finally, the search button 416 is provided to execute a search of the book database for books that satisfy the one or more criteria entered in the fields above.

A graphical user interface displaying an exemplary web page output for the book rating function, provided to the client by the web server and showing a subsequent input/request page to be filled in by the customer, according to one embodiment of the present invention, is shown in FIG. 5. The subsequent rating GUI 500 of FIG. 5 has a header field 502, a first instruction field 504, a second instruction field 506, a results list header box 508, a results list 520, one or more 'more detail' buttons 528, and a 'get estimate' button 530. The header field 502 recites "Rating the book for you," as with FIG. 4. The first instruction field 504 of FIG. 5 delineates the second (subsequent) step of the rating function, reciting "Identify the book." The second instruction field 506 of FIG. 5 provides specific instruction for this second step in the rating function (per first intruction field 504 of FIG. 5); the specific instruction is "Please choose the book you are looking for and click on the 'get estimate' button. The second instruction field 506, then, indicates instruction for selecting one or more of the books from the results list 520, which is described in detailed below.

The results list 520 and the results list header box 508 are located below the second instruction field 506 in the embodiment of FIG. 5. The results list header box 508 of FIG. 5 contains the column headings of the particular categories, for the items in the result list 520, that are desired to communicate the potential books that the customer might consider receiving a rating on. In the embodiment shown in FIG. 5, the results list header box includes title and author headers of the potential books, as well as a check box column-header. The corresponding results list 520 contains the titles of the potential books (here, ABC and XYZ) as well as the authors of the potential books (here, Jeff Richards and Tom Bednash). The result list 520 also contains check boxes selectable with a cursor/mouse that will flag that entry for getting an estimate or rating. When the 'get estimate' button 590 is selected, the flagged book entry is then processed by the database server to determine an estimate or rating according to the respective algorithm. The resultant estimate or rating is then displayed to the customer, as shown in FIG. 6 and described next.

According to one embodiment of the present invention, a graphical user interface that shows an exemplary web page output displaying of an estimate or rating of the book that has been determined (by the database server) to be an appropriate result for the book the customer has selected, is shown in FIG. 6. The estimate GUI 600 of FIG. 6 is comprised of a header field 602, a book identifier field 604, a book information field 606, a first 'more detail' button 608, a value field 612, a similarity field 614, and a second 'more detail' button 620. The header field 602 recites "Estimate of the book for you," explaining that the information below describes, with respect to the book selected by the customer, an estimate keyed to the most appropriate book registered by the customer. Field headings such as 'title' and 'author' are contained in the book identifier field 604 for the purpose of indicating the corresponding information in the book information field 606. Data corresponding to these field headings are then located in the book information field 606 (i.e., 'xyz' and 'Tom Bednash' in FIG. 6). The first 'more detail' button 608 may be selected by a customer to show further details of the prospective book, such as publication information, a book summary or the like.

The value field 612 and the similarity field 614 are located below these book-related fields on the estimate GUI 600. The value field 612 supplies the customer with an overall rating of the estimated book; the gauge on the right side of this field (i.e., 0–5 stars, etc.) provides the customer with some sort of general value of reading the book, as determined by empirical techniques such as collaborative filtering. The similarity field 614 is also located below the book-related fields, and provides a measure of how closely the estimated book matches the chosen book. According to the method used, the magnitude of this measure correlates to how closely the estimated book matched the chosen book, and can be expressed in simple percentages. The second 'more detail' button 620 can be located in the lower right hand corner, near to the similarity field 614, and is selected by a customer to provide further detail with regard to the book upon which the estimate has been keyed.

There are usually six steps in the preferred rating/estimate functionality associated with FIGS. 4–6. A customer first enters information concerning a book, about which the customer is wondering whether he or she should read. This information is entered at the client via the interactive GUI of FIG. 4. Next, the web server requests the database server to search the book database based on the information sent by the customer. These search results are then sent to the web server, and the web server sends corresponding GUI information to the client. According to this GUI information, the client displays the subsequent rating GUI 500 shown in FIG. 5. From the subsequent rating GUI 500 screen, the customer chooses or confirms the book that he or she is considering.

By using this chosen book identity, then, the web server requests the database server to search all keyword data of the customer database based on the keywords of the chosen book data. Then the database server finds a book that has the most keywords in common to the chosen book keywords. The database server can also calculate the similarity rate of the keywords, and grades the chosen book according to the rate.

Instantaneous Registration of Relevant Books, and Algorithms

According to an alternate embodiment of the present invention, a customer does not have to register the books that he or she has read in advance of the book rating process. In the above-discussed rating/estimate process, the database server first finds the books that are related to the chosen book according to the keywords of the chosen (to be estimated) book. The list of the related books is then displayed. From this display, the customer checks all of the books he or she has read off of the list. After this alternate registration process, the rating and estimate processes are identical to the previous embodiment described above. For this alternative registration process, the checked books may be registered in the customer database so that the customer does not have to input the same books. When the list of related books is displayed the next time, the registered books should be checked before the customer's input (checking).

Another alternate embodiment of the present invention contemplates the scenario in which a customer has not identified a particular book for rating and estimation. In this situation, the rating algorithm is different from the algorithm used in the preferred embodiment above. A four-step algorithm is used to find a book that suits a customer's taste. In the first step, the database server narrows the object field based on keywords or natural language inputted by a customer, and then the data of the books that the customer is interested in is extracted from the book database. In the second step, the data is sorted according to sales.

Figure 7:
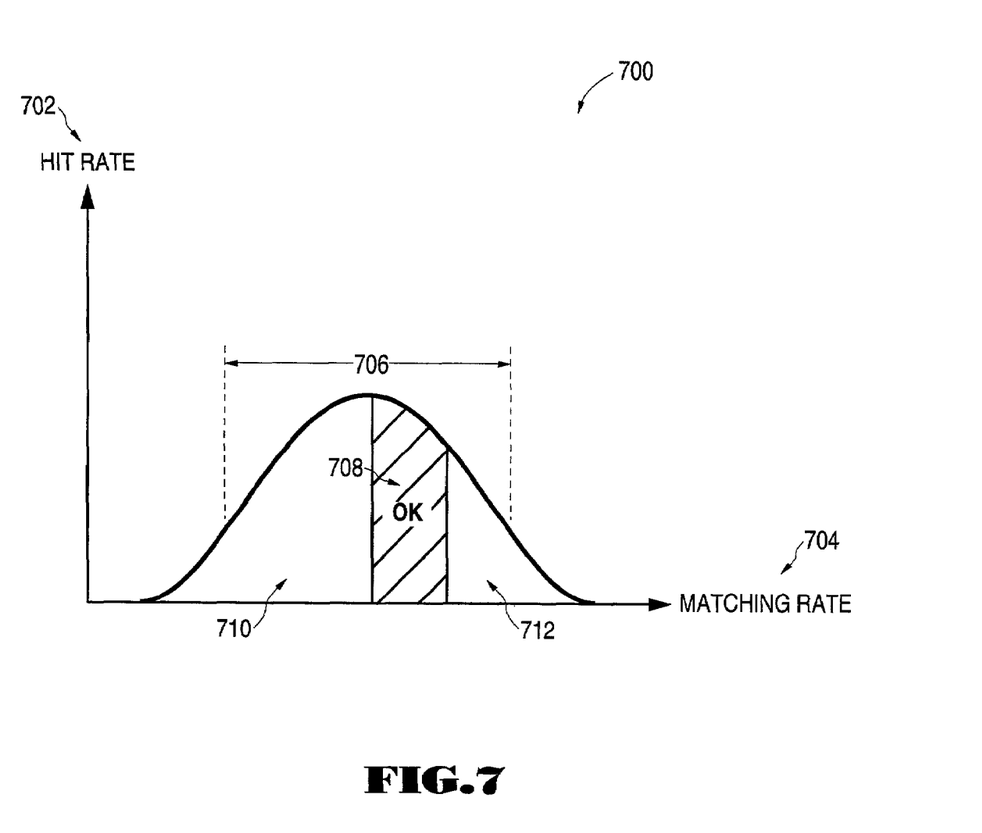
FIG. 7 is a graph illustrating the range of keyword matching that corresponds to an acceptable range in an alternate algorithm used to provide a desirable search results, according to one embodiment of the present invention.

In the third step, book data having both too many and too few keywords equal to the keywords in the customer's book data are eliminated by use of the keyword matching. FIG. 7 shows a keyword-match graph 700 illustrating a representative bell curve 706 associated with such keyword search results, according to this embodiment. Graph 700 has, as its x-axis, the 'matching rate' 704 or quantity of keywords that match, with the greatest number of matches extending to the right. The y-axis of keyword-match graph 700 reflects the 'result rate' 702 or the quantity of books that satisfy the corresponding rate (x-axis) value of matched keywords. For example, books within the acceptable range 708 of matched keywords share a certain percentage of the sought keywords, with this range being reflected on the x-axis (i.e., perhaps a range of approximately 60–75%, as seen in FIG. 7). As described above, the algorithm rejects books sharing too few keywords 710 as well as books sharing too many keywords 712, leaving books within the acceptable range 708. The matching rate of keywords (x-axis), then, relates to the result rate or quantity of books by a bell curve relationship 706. This is simply to say that a greater number of results or books will share a middle range of keyword with the chosen book, as seen in the center (highest point) of the curve, with the number of results or books tapering off as the matching rate either increases or decreases.

The fourth step is essentially a reiteration of the first three steps if the particular results are found to be unacceptable. If the results of step three are not suitable, the keywords are exchanged to another data type (i.e., author, publisher, etc.) and the matching procedure is executed again.

In the foregoing, a system has been described for providing book ratings and/or recommendations that can be customized based on customer profiles or other criteria. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for providing evaluation information to a customer using a system comprising a first database configured to store data concerning text content and a customer database configured to store data concerning text content read by a customer, the method comprising the steps of:

storing data exclusively concerning text content read by the customer in the customer database, receiving a search request comprising a search item from the customer, the search request being initiated by the customer to search for the search item;

comparing data concerning the search item with the stored data associated with text content previously read by the customer, the comparing being facilitated by accessing the first database and the customer database to obtain rating data that is generated based on input from the customer regarding text content read by the customer or generated based on information from purchase records or transactions related to the text content read by the customer, and the comparing of data being responsive to receipt of the search request; and transmitting the obtained rating data for results from the search to the customer for display at a customer computer;

whereby the rating data is partly augmented with transaction data associated with either the purchase records or transactions concerning the text content previously read by the customer.

2. The method of claim 1, further comprising transmitting similarity data to a customer computer for display, wherein the similarity data indicates the similarity of the search item with at least one item included in the text content previously read by the customer.

3. The method of claim 2, wherein the similarity data is a rating of the percentage similarity between the search item and at least one item included in the text content previously read by the customer.

4. The method of claim 1, further comprising the step of registering information regarding the text content previously read by the customer in the customer database, the registering includes obtaining on-line and off-line data regarding the purchase record transaction data that is related to the text content read by the customer.

5. The method of claim 4, wherein the step of registering information includes receiving search item information from the customer computer, instructing a database server to search the first database, and generating a search results list.

6. The method of claim 1, wherein the text content read by the customer is one of (a) text-based, (b) text and graphics based, (c) magazine based, (d) computer generated text based, (e) illustration based, or (f) written and graphical material based.

7. The method of claim 6, wherein the step of establishing the search item under consideration by the customer is accomplished by:

receiving search criteria information from the customer;

instructing the database server to search the first database; and displaying potential text content items on a customer web browser.

8. The method of claim 7, wherein a text content item selected by the customer is used in obtaining rating data.

9. The method of claim 7, wherein a text content item selected by the customer is used in obtaining similarity data.

10. The method of claim 8, wherein a text content item selected by the customer is used in obtaining similarity data.

11. The method of claim 1, wherein the step of comparing data includes:

searching keyword fields in the customer database based on keywords of the search item; and rating candidate text content according to an algorithm.

12. The method of claim 11, wherein the algorithm rates text content having a greater number of keywords in common with the search item under consideration higher than text content sharing fewer keywords.

13. The method of claim 11, wherein the algorithm rates text content having a number of keywords in common, in the range between about 60 percent and about 75 percent, with the search item under consideration as the highest-rated text content.

14. A method for providing evaluation information to a customer using a system comprising a first database configured to store data concerning text content and a customer database configured to store data concerning text content read by the customer, the method comprising the steps of:

receiving a search request comprising a search item from the customer, the search request being initiated by the customer to search for the search item;

comparing data concerning the search item with data limited to text content previously read by the customer, the comparing being facilitated by accessing the first database and the customer database to obtain rating data that is generated based on input from the customer regarding text content read by the customer or generated based on information from purchase records or transactions related to the text content read by the customer, and the comparing of data being responsive to receipt of the search request;

transmitting the obtained rating data for results from the search to a customer computer for display, and the rating data is partly augmented with transaction data associated with either the purchase records or transactions concerning the text content previously read by the customer; and transmitting similarity data to the customer computer for display, wherein the text content read by the customer is one of (a) text-based, (b) text and graphics based, (c) magazine based, (d) computer generated text based, (e) illustration based, or (f) written and graphical material based.

15. The method of claim 14, further comprising the step of registering information regarding the text content previously read by the customer in the customer database, the registering includes obtaining on-line and off-line data regarding the purchase record transaction data that is related to the text content read by the customer.

16. A method for providing evaluation information to a customer using a system comprising a first database configured to store data concerning text content and a customer database configured to store data concerning text content read by the customer, the method comprising the steps of:

registering information regarding the text content previously read by the customer in the customer database, the registering includes obtaining on-line and off-line data regarding purchase record transaction data that is related to the text content read by the customer;

receiving a search request comprising a search item from the customer, the search request being initiated by the customer to search for the search item;

comparing data concerning the search item with the stored data limited to text content previously read by the customer, the comparing being facilitated by accessing the first database and the customer database to obtain rating data that is generated based on input from the customer regarding text content read by the customer or generated based on information from purchase records or transactions related to the text content read by the customer, and the comparing of data being responsive to receipt of the search request; and transmitting the obtained rating data for results from the search to a customer computer for display;

whereby the rating data is partly augmented with transaction data associated with either the purchase records or transactions concerning the text content previously read by the customer.

17. A method for providing text content evaluation information to a customer computer in response to a request for item evaluation information from the customer computer using a system comprising (1) the customer computer programmed to transmit a request for text content evaluation information and to display the results; (2) a bi-directional network connection between said customer computer and a web server allowing data transfer therebetween; (3) a first database for storing data concerning text content; (4) a customer database for storing data concerning text content read by a customer operating the customer computer; and (5) a database server, connected to the web server, programmed to receive customer computer requests through the web server, to process requests, to access the first database, to access the customer database, and to provide results to the web server, the method comprising the steps of:

a) initiating a request at the customer computer to evaluate a single search item under consideration by the customer, wherein the request being initiated by the customer;

b) receiving the request at the web server;

c) transmitting the request from the web server to the database server, whereby the database server compares data concerning the item stored in the first database with data limited to text content read by the customer operating the customer computer to obtain evaluation information responsive to the request, the evaluation information being partly augmented with transaction data associated with either purchase records or transactions concerning the text content read by the customer operating the customer computer;

d) transmitting the evaluation information from the database server to web server for displaying the evaluation information at the customer computer; and registering information regarding the text content read by the customer in the customer database, the registering including obtaining on-line and off-line data regarding the items purchased by the customer that relate to the text content read by the customer operating the customer computer;

wherein the text content is one of (a) text-based, (b) text and graphics based, (c) magazine based, (d) computer generated text based, (e) illustration based, or (f) written and graphical material based.

* * * * *